June 11, 1968   R. R. RABJOHN   3,387,681
POWER OPERATED WHEEL CHAIR
Filed Feb. 14, 1966   2 Sheets-Sheet 1

INVENTOR.
RODNEY R. RABJOHN
BY William B. Everett
AGENT

June 11, 1968 R. R. RABJOHN 3,387,681
POWER OPERATED WHEEL CHAIR
Filed Feb. 14, 1966 2 Sheets-Sheet 2

INVENTOR.
RODNEY R. RABJOHN
BY William G. Everett
AGENT 3,387,681
POWER OPERATED WHEEL CHAIR
Rodney R. Rabjohn, 9850 Stanwin Ave.,
Pacoima, Calif. 91331
Filed Feb. 14, 1966, Ser. No. 527,029
13 Claims. (Cl. 180—13)

ABSTRACT OF THE DISCLOSURE

The invention provides a compact, steerable motor drive and control assembly which can be quickly mounted to conventional wheel chairs including the foldable type to convert them from manual to powered operation. A battery driven motor delivers power to a traction wheel which rotates about the motor and can be steered in any direction by a tiller type control assembly having an operable handle for speed control purposes. The frame may be used for the grounded return path to the battery to provide fail safe operation. An unobstructed passageway for seating, etc. is assured by the rotatable feature of the control assembly.

---

This invention relates to wheel chairs and more particularly to power operated wheel chairs and to a motor drive and control assembly for converting conventional manually powered wheel chairs to power operation.

Power operated wheel chairs as such are not new. In U.S. Letters Patent 3,023,825 granted to me on Mar. 6, 1962, I disclosed such a power operated wheel chair. As will be seen below, the present invention incorporates numerous and unique changes over the wheel chair described and claimed in my earlier patent.

Briefly, the invention to be described comprises a motor drive and control assembly which is operatively mounted to the frame of a conventional wheel chair. Preferably, one of the front casters is removed, either the right or left as desired, and the motor drive and control assembly suitably clamped to, for example, the appropriate upstanding frame member.

Power for the motor drive is supplied from a storage battery which is removably disposed in a novel battery support structure or device which, aside from providing circuit continuity to the traction motor drive through a novel control assembly utilizing a plurality of carbon discs, in turn is readily removable. This feature of being able to remove not only the battery but also the battery support device means that wheel chairs of the foldable type can now be easily converted for power operation. A detailed description of the battery support device is contained in a co-pending patent application, Ser. No. 527,295, filed by me on Feb. 14, 1966.

But, one other requirement must be met before it becomes practical and economically feasible to convert folding wheel chairs for power operation. And this requirement is that the motor drive and control assembly need not be removed or mechanically repositioned each time the wheel chair is to be folded and vice versa.

This requirement is fully met by the motor drive and control assembly used in the present invention. In addition, the motor drive and control assembly when operatively mounted to the wheel chair frame does not obstruct the passageway or space through which the occupant must pass when moving to and from a seated position in the chair. Furthermore, once seated even a near totally handicapped person can operate the invention since only a minimal of effort is required. As stated, left-hand or right-hand operation can be provided. Conceivably, controls could be mounted on the foot rests of the wheel chair to enable individuals with arm injuries or even without arms to operate the invention. Electrically, all parts likely to come into contact with the users are held at ground potential through the wheel chair frame. Mechanically, a cantilever type of housing carries the motor around which the traction wheel is driven via suitable gearing. For safety purposes as well as appearance, the motor drive housing covers and protects substantially all moving mechanical and electrical parts. The result is an improved power operated wheel chair, one in which the patient can operate easily and with great maneuverability and reliability without having to invest heavily at the outset and then find exceedingly high, recurring maintenance charges.

According to the invention, there is provided a power operated wheel chair comprising in combination frame means including a structure having a back rest portion and a supporting seat portion, a pair of wheels rotatably mounted along a line extending horizontally across the back side of the structure, and a substantially smaller wheel relative to each wheel of the pair, the smaller wheel being rotatably mounted to the structure at a front corner portion thereof in caster-like arrangement; means mechanically coupled to the structure at the other front corner portion thereof and including a motor drive and control assembly, the motor drive including a housing, a motor means disposed in the housing, a traction wheel surrounding the motor means and in contact relationship with the surface in contact with the pair of wheels and the smaller wheel, and means for coupling the motor means to the traction wheel in predetermined geared relationship therewith; source means including a storage battery for supplying electrical energy to the motor means, the motor drive and control assembly including variable resistance means serially coupled between the battery and the motor means and responsive to manual operation to control the speed and torque output of the motor means; and support means for the source means and including a battery support device disposed on the frame means between each of the pair of wheels, the support device including conductor means for electromagnetically coupling the battery in series circuit relationship with the motor drive and control assembly.

It is therefore the primary objective and purpose of the invention to provide an improved power operated wheel chair.

It is another object of the invention to provide a compact, steerable motor drive and control assembly with provisions for supplying controlled power to the motor drive, the entire assembly being readily mounted to conventional wheel chairs for converting them from manual to power operation.

It is still another object of the invention to provide a power operated wheel chair that can be operated in any direction of the compass including reverse.

It is yet another object of the invention to provide a power operated wheel chair of the type described that permits the user to move into and out of a seated position unobstructively.

Another object of the invention is to provide a power operated wheel chair of the type described wherein a minimum of effort is required for controlled operation to permit usage by the partially or near totally handicapped individuals.

Still another object of the invention is to provide a power operated wheel chair of the type described wherein a conventional storage battery may be used as a source of power and wherein provisions are made for readily exchanging the storage battery whenever charging is required.

Yet another object of the invention is to provide a power operated wheel chair of the type described that utilizes a compact, steerable motor drive and control assembly which may be selectively mounted in operative disposition on the left front or the right front corner of a conventional wheel chair frame to permit left-hand or right-hand operation respectively.

It is another object of the invention to provide a compact, steerable motor drive and control assembly having a minimum of moving parts, each disposed with the motor drive housing to assure maximum safety, and wherein all parts likely to come into contact with the user including the controls to be manipulated for operation are electrically tied to the main wheel chair frame and to ground potential.

Other objects, features and advantages of the invention will appear and be brought out more fully in the following specification reference being had to the accompanying drawing wherein.

Figure 1:
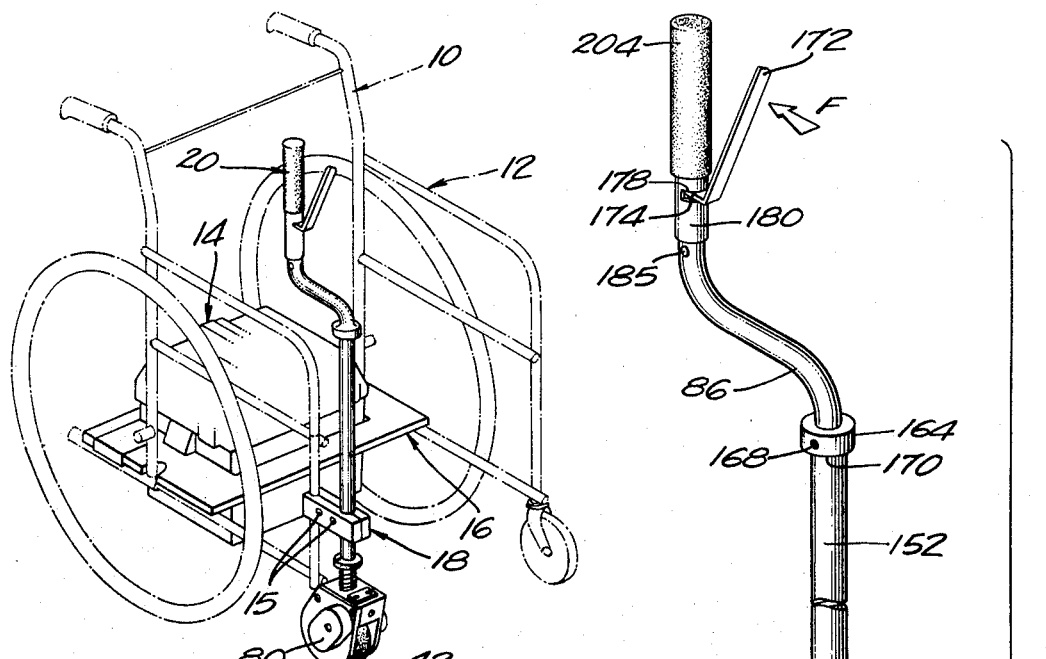
FIGURE 1 is a perspective view of an improved power operated wheel chair according to the invention.

Referring now to FIGURE 1 of the drawings, shown there in perspective form is a power operated wheel chair 10 constructed in accordance with the invention and comprising a frame 12, a source of electrical energy 14, an apparatus 16 for receiving and supporting the source 14 on the frame 12 and a bracket 18 mounted on the frame 12 by means of conventional fasteners 15 for supporting in operative disposition a motor drive and control assembly 20.

For the frame 12, a conventional wheel chair having a back rest portion, a seat portion and two large rear wheels with one of the small front caster-like wheels removed may be used. In FIGURE 1, the frame 12 shown is formed of tubular stock for descriptive purposes only. It should be noted that a foldable type of wheel chair could have also been used.

Figure 2:
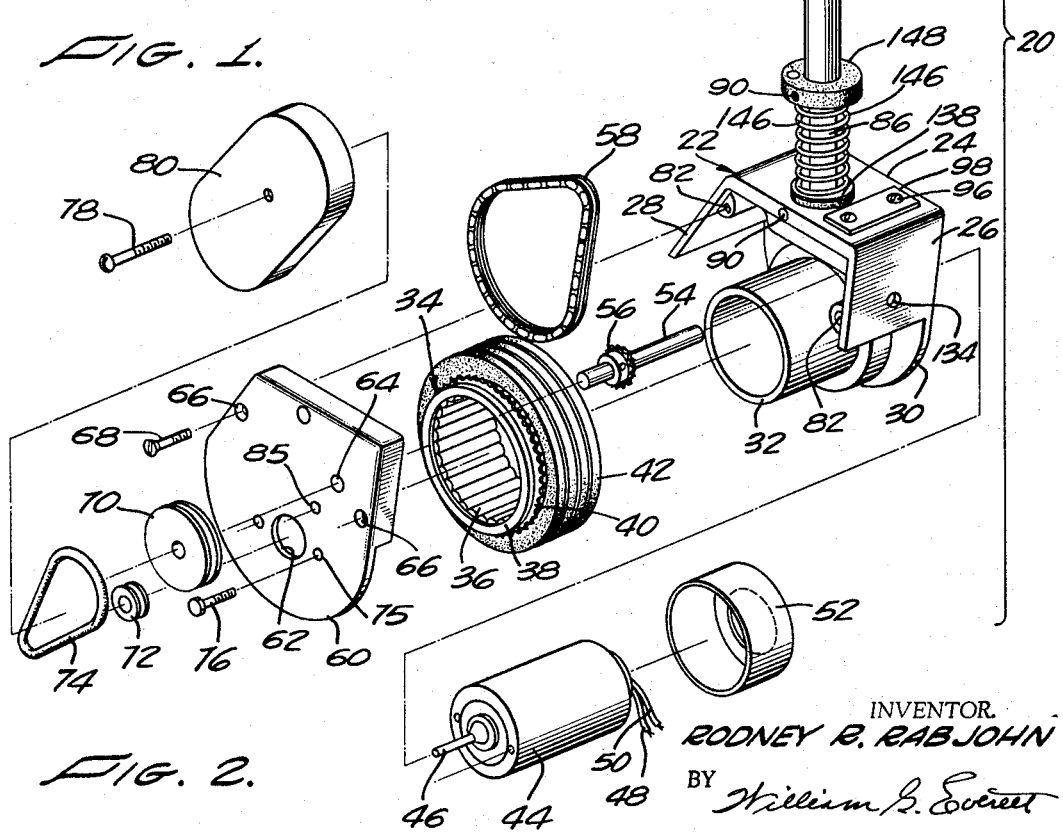
FIGURE 2 is a partial exploded perspective view of the motor drive and control assembly shown in FIGURE 1 according to the invention with the control portion shown in assembled disposition.

As best seen in FIGURE 2, the motor drive and control assembly 20 includes a housing 22 having a top wall 24 with a downwardly and slightly rearwardly extending front and rear skirts, 26 and 28. A side wall 30 is provided and may be formed by sand casting as an integral part of the wall 24 and the skirts 26 and 28. If desired, the housing 22 may be an alloy die casting instead.

A sleeve 32 is provided and suitably attached to the fixed side wall 30 to form a cantilever type of construction. Again the sleeve 32 may be initially formed as an integral part of the housing extending outwardly below the top wall 24 and parallel to it from the inner surface of the fixed side wall 30. The former arrangement is preferred for the reason that the sleeve 32 can be centerless ground to receive a bearing 34 having a plurality of roller bearings 36 disposed in rotatable operation in a race 38. A driven ring member 40 and a tire 42 forming a traction wheel is pressed onto the race 38.

In the center of the sleeve 32 is disposed a motor 44 which may be a permanent magnet type of direct current motor having a shaft 46 and two leads 48 and 50 across which a suitable voltage is impressed in controlled variation for reasons to be described. A cover 52 may be disposed over the end of the motor 44 to protect that portion extending outwardly from the fixed side wall 30 after the motor 44 is mounted in the sleeve 32.

A power transmitting shaft 54 having a driving member 56 in alignment with the driven ring member 40 to receive a conventional chain 58 is provided for reasons to be described. Instead of the chain and sprocket combination shown, either a planetary gear system or an external or internal type of ring gear system with a driving gear in suitably gear engaging relationship may be used.

A removable side wall 60 is provided to complete the housing 22. The side wall 60 may comprise a mirror image of the fixed side wall 30 except that the opening 62 through which the shaft 46 of the motor 44 extends is substantially smaller in diameter than the similarly disposed opening, not shown, in the fixed side wall 30 and through which the motor 44 is passed for positioning in the sleeve 32.

The removable side wall 60 is provided with an opening 64 for receiving the shaft 54. A similar opening, not shown, is provided in the fixed side wall 30 for the other end of the shaft 54.

Openings 66 which may be counter sunk are also provided for attaching the side wall 60 by means of threaded fasteners 68 to the housing 22. Mounted to the shafts 54 and 46 after the removable side wall 60 is fastened in place are a driven pulley 70 and a driving pulley 72 respectively. A belt 74 is provided for the pulleys 70 and 72 for transferring power from the motor 44 to the power transmitting shaft 54 and hence to the tire 42 through the driving member 56 coacting with the chain 58 in the embodiment shown to the driven ring member 40. It should be pointed out that gears and gear trains as well as belts and chain belts may be used in place of the chain and sprocket system which is shown only for purposes of describing a complete, working embodiment.

Openings 75 in the side wall 60 receive cap screws 76 for securing the motor 44 in place in the sleeve 32. A somewhat longer cap screw 78 is provided for mounting a pulley cover 80 to the side wall 60 and over the pulleys 70 and 72. A threaded opening 85 is provided for the cap screw 78. The pulley cover 80 conceals all openings and fasteners except the fasteners 68 which are received in threaded openings 82 disposed along the inner surface of the skirts 26 and 28.

Figure 3:
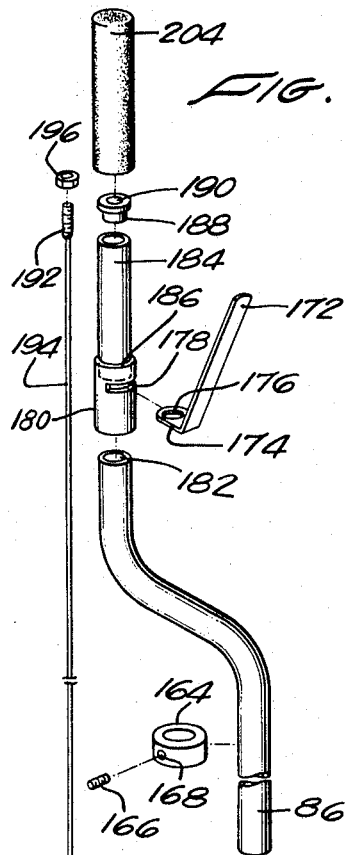
FIGURE 3 is an exploded perspective view of the assembled control portion of the motor drive and control assembly of FIGURE 2.
Figure 4:
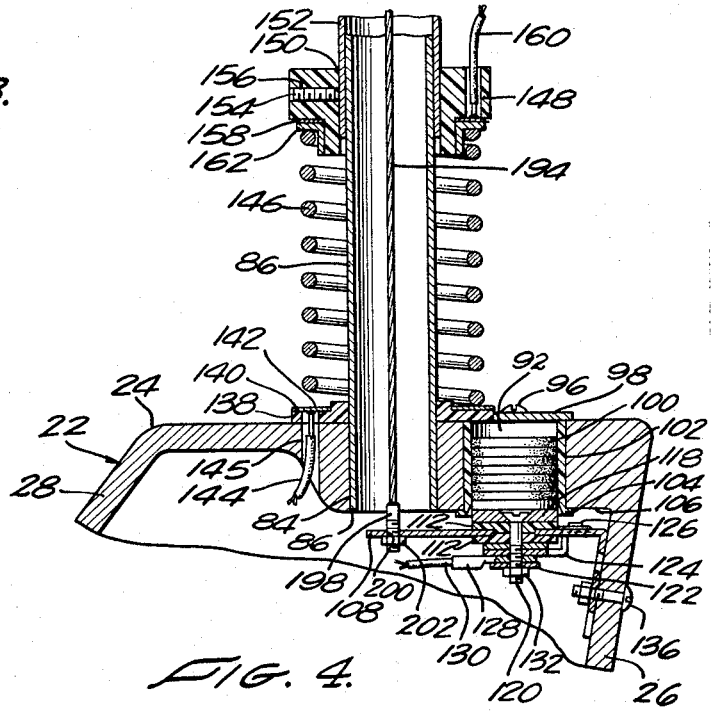
FIGURE 4 is an enlarged cross-sectional view of a portion of the motor drive and control assembly of FIGURES 2 and 3 and as shown in FIGURE 1.

As best seen in FIGURES 3 and 4, an opening 84 is provided in the top wall 24 of the housing 22 for receiving a movable tubular column 86. A set screw 88 and a threaded opening 90 communicating with the opening 84 may be provided to secure the column 86 in the housing 22.

Another opening or bore 92 is provided in the top wall 24 with two threaded openings 94 disposed on either side for receiving machine screws 96 which in turn secure a cover plate 98 to the top wall 24. A plurality of resistive discs 100 made preferably from carbon material are disposed in the opening 92 with a cylindrical insulating liner 102 surrounding the discs 100. The liner 102 may have an annular lip 104 and be inserted in the opening 92 from the inside lower surface 106 of the top wall 24 with the lip 104 in contact with the surface 106, as best seen in FIGURE 4.

By providing the mechanism about to be described, the carbon discs 100 can be pressed together and in so doing the resistance to electrical current flow decreased accordingly to provide what may be termed a variable resistance means. In FIGURE 3, this variable resistance means is shown in exploded perspective and includes the carbon discs 100, the cover plate 98, the insulating liner 102, and a lever 108 having a relatively large central opening 110 disposed in axial alignment with the opening or bore 92.

A fiber insulating washer 112 having an annular bearing surface 114 is placed in the opening 110 from each side of the lever 108 with the bearing surfaces 114 facing each other. A conductive washer 116 having a countersunk center hole 118 is placed on top of the uppermost fiber washer 112.

A flat head machine screw 120 is positioned in the center hole 118, through the fiber washers 112 and receives a conventional metal washer 122, an elongated contact strip element 124 having a contact point 126 at its outer end, and a lug element 128 to which a conductor 130 is terminated, with a standard nut 132 threadedly engaged to the machine screw 120.

The strip element 124 may be bent as shown in FIGURE 3 so that a predetermined displacement upwardly as seen in FIGURE 4 is required before the contact point 126 engages the surface 106 and electrically by-passes or short circuits the carbon discs 100. The lever 108 is attached to the housing 22 by means of a threaded fastener 136 which is operatively disposed in an opening 134 provided in the front skirt 126.

Figure 5:
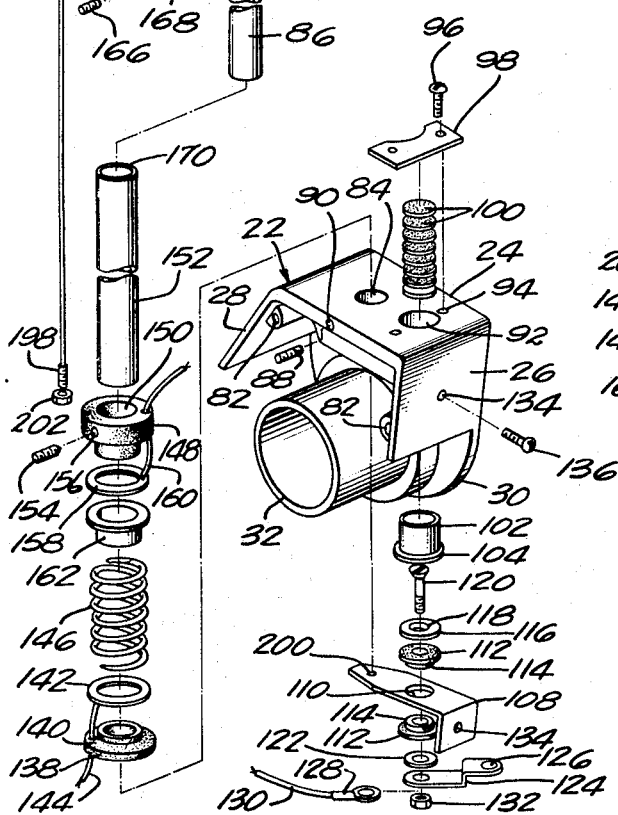
FIGURE 5 is a schematic diagram of the power operated wheel chair of the invention.
Figure 5:
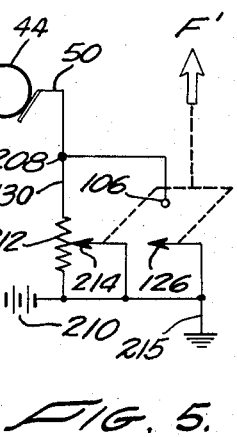

Surrounding the opening 84 is a fiber washer 138 having an annular bearing surface 140 on which a conductive flat washer 142 is carried. A conductor 144 is soldered to the washer 142 and inserted through an opening 145 which extends through the housing 22 and the fiber washer 138. A coil spring 146 is provided and rests on the washer 142. A fiber insulating collar 148 having an opening to receive a stationary tubular column 152 of predetermined length is secured to the column 152 by means of a set screw 154 threadedly engaged in a threaded opening 156. A conductive washer 158 having a conductor 160 soldered thereto is provided and in contact engagement with the coil spring 146 in a manner similar to the washer 142. If desired a spring guide 162 may be provided at both ends of the spring 146. The conductor 160 is connected to the source of electrical energy 14 as shown in FIGURE 5 infra.

It should be clear that the column 86 extends through the column 152 and hence through the washers 148 and 158, the spring 146, the washers 142 and 138 and into the opening 84 and is attached to the housing 22 by set screw 88.

A collar 164, reference FIGURES 2 and 3, is attached to the movable column 86 by a set screw 166 disposed in a threaded opening 168 of the collar 164. The top edge 170 of the stationary column 152 is urged into contact relationship with the collar 164 by pre-loading the coil spring 146 and allowing the collar 164 to slide downwardly onto the edge 170 before tightening the set screw 166. As seen in FIGURE 1, the bracket 18 comprises a clamping device for attaching the assembly 20 of FIGURE 2 to the frame 12. The bracket 18 is attached to the frame 12 and to the stationary column 152 at some point below the top edge 170 and above the fiber collar 148.

As best seen in FIGURE 3, a control level 172 having a short extension 174 with an opening 176 is provided to selectively operate the variable resistance means described in conjunction with FIGURES 3 and 4. A slot 178 to receive the extension 174 is provided in a short sleeve 180 into which the upper end 182 of the column 86 is inserted. Into the other end of the short sleeve 180 and welded therein along a weld line 186 is a slightly longer tubular section 184. The sleeve 180 may be attached to the column 86 by a pin 185, reference FIGURE 2.

A fitting 188 having an opening 190 through which a threaded end 192 of a cable 194 is passed is held in place by a lock nut 196. Similarly, at the lower end of the cable 194, a threaded end 198 is passed through an opening 200 provided in the outer end of the lever 108 and likewise held in place by a lock nut 202. With the cable 194 passing through the opening 84, the column 86, the short sleeve 180, the opening 176 of the control lever 172, through the tubular section 184 and the opening 190 of the fitting 188, it can be seen that the distance over which the force F, reference FIGURE 2, must be applied can be pre-set by appropriately adjusting the lock nuts 196 or 202. Shortening the cable 194 means that the control lever must travel a shorter distance toward the control assembly, which may include a rubber handle or grip 204. The reverse or lengthening cable 194 would mean that the control lever 172 would have to be moved further toward the handle 204 to place the cable in the same tension as before.

It should be noted that as a force F is applied to the control lever 172, as for example, when the operator of the invention, a power operated wheel chair, squeezes the handle, the outer edge of the extension 174 makes contact with a part of the edge 182 of the column 86 and in turn the upper and inner portion of the extension 174 makes contact with the upper edge of the slot 178 to impart an upward force and movement of the short sleeve 180, the tubular section 184, the fitting 188 and hence the handle 204. As the cable 194 is pulled upwardly, the lever 108 which may be spring steel is moved upwardly to compress the carbon discs 100 with the upper disc making electrical contact with the cover plate 98. Such movement of the control lever 172 causes first the completion of the electrical circuit and with successively greater force F, the gradual lowering of resistance in the electrical circuit and hence more current flow to the motor 44.

In FIGURE 5, there is shown an electrical diagram of the invention. The motor 44, having leads 48 and 50 connected to junctions 206 and 208 respectively, is shown with the lead 48 ultimately connected to a positive terminal of a battery 210 by way of conductors 144 and 160 with the negative terminal or ground 215 of the battery 210 being connected to the junction 208 through the conductor 130 and a series resistive element 212 representative of the resistance characteristics of the carbon discs 100. The resistive element 212 is shown with a first moving contact 214 and a second moving contact having a reference numeral 126 since the contact point 126 is representative of the second moving contact in the same way that the open circle having a reference numeral 106 is truly representative of the surface 106 of the housing 22. Stated differently, as the force F is exerted to squeeze the control lever 172, the discs 100 are pressed together resulting in a lowering of the resistance and hence more current flow and more revolutions of the motor 44 until at some force, the contact point 126 touches the surface 106 and the resistance falls to zero. Thus, when the force F', reference FIGURE 5, is large enough, the contact 126 engages the terminal 106 to short circuit the resistance element 212 in precisely the same way.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

I claim:
1. A power operated wheel chair comprising in combination
    frame means including a structure having a back rest portion and a supporting seat portion, a pair of wheels rotatably mounted along a line extending horizontally across the back side of said structure, and a substantially smaller wheel relative to each wheel of said pair, said smaller wheel being rotatably mounted to said structure at a front corner portion thereof in caster-like arrangement;
    means mechanically coupled to said structure at the other front corner portion thereof and including a motor drive and control assembly, said motor drive including a housing having a cylindrical member disposed therein, a motor means disposed in said cylindrical member, a traction wheel surrounding said motor means in rotatable disposition on said cylindrical member and in contact relationship with the surface in contact with said pair of wheels and said smaller wheel, and means for coupling said motor means to said traction wheel in predetermined geared relationship therewith;

source means including a storage battery for supplying electrical energy to said motor means, said motor drive and control assembly including variable resistance means serially coupled between said battery and said motor means and responsive to manual operation to control the speed and torque output of said motor means; and support means for said source means and including a battery support device disposed on said frame means between each of said pair of wheels, said support device including conductive means for electromagnetically coupling said battery in series circuit relationship with said motor drive and control assembly.

2. The power operated wheel chair in accordance with claim 1 further characterized in that said motor drive and control assembly includes stationary tubular means;

clamp means fastened to stationary tubular means for mounting said assembly to said structure at one of said forward corner portions thereof;

movable tubular means extending axially through said stationary tubular means and attached at a lower end to said housing;

a control lever operatively disposed at the upper end of said movable tubular means; and cable means operatively coupled at one end to said variable resistance means and at the other end to said control lever to impose a force through said cable means to said variable resistance means upon predetermined manipulation of said control lever.

3. The power operated wheel chair in accordance with claim 2 further characterized in that said movable tubular means includes collar means disposed between said control lever and said housing; and in that said stationary tubular means is urged at its upper end against said collar means by spring means disposed in compressed relationship between said housing and the lower end of said stationary tubular means, said spring means including a first flat annular ring mounted on said stationary tubular means in electrical isolation therefrom, a second flat annular ring mounted on said housing in electrical isolation therefrom, and a coil spring movably disposed around said movable tubular means and between said first and second flat annular ring in electrical contact relationship therewith, said first and second flat annular rings being electrically connected to one terminal of said storage battery and to one terminal of said motor means respectively.

4. The power operated wheel chair in accordance with claim 3 further characterized in that said variable resistance means is disposed in said housing and includes a plurality of discs formed from materials having predetermined resistive properties including carbon, a bore disposed in said housing for receiving said discs in stacked cylinder-like arrangement, a liner of insulative material in said bore and surrounding all of said discs other than the uppermost disc, a lever pivotally mounted at one end thereof to said housing and extending over the lower end of said bore and forming a support for said plurality of resistive discs, threaded fasteners disposed at the other end of said lever for receiving said cable means in force transmitting relationship to urge said resistive discs upwards against the uppermost disc and in turn urge all of said discs against said housing to form a conductive path of less resistance by manipulating said control lever.

5. The power operated wheel chair in accordance with claim 4 further characterized in that said variable resistance means includes movable contact means attached to said pivotable lever and adapted to engage said housing in electrical contact relationship upon manipulating said control lever to a predetermined position representative of maximum power operation.

6. The power operated wheel chair in accordance with claim 2 further characterized in that said housing includes two opposing side walls; a top wall having a first opening to receive said movable tubular means in fixed relationship therein and a second opening for receiving said variable resistance means in operative disposition, one of said side walls depending downwardly from said top wall along one side thereof and the other of said side walls being threadedly fastened to said top wall;

a sleeve member extending orthogonally between said side walls and adapted to carry said motor means in axial alignment therein;

bearing means operatively disposed on said sleeve member and including outer race means and a plurality of roller bearings adapted to rotate over surfaces formed by the outer cylindrical portion of said sleeve member and the inner cylindrical surface of said race means, said traction wheel being disposed on said bearing means;

a driven ring member disposed on said bearing means in force transmitting relationship;

a power transmitting shaft disposed orthogonally to said traction wheel and to said driven ring member and including a driving member disposed in operative alignment with said driven ring member;

and first and second power transmission means for coupling said motor means to said power transmitting shaft and for coupling said driving member to said driven ring member respectively for transferring power and torque from said motor means to said traction wheel.

7. The power operated wheel chair in accordance with claim 6 further characterized in that said first power transmission means comprises a first pulley operatively mounted on the shaft of said motor means, a second pulley operatively mounted on said power transmitting shaft in alignment with said first pulley, and belt means operatively disposed in power transmission relationship on said first and second pulleys; and in that said second transmission means comprises said driven ring member, said driving member, and chain means coacting between said members for transferring power from said power transmitting shaft to said traction wheel.

8. In a wheel chair comprising a frame having a back rest portion and a seat portion and including a plurality of wheels rotatably mounted to said frame, a motor drive and control assembly for said wheel chair comprising in combination a housing; a cylindrical member horizontal disposed within said housing; motor means operably disposed in said cylindrical member; a traction wheel rotatably mounted on said cylindrical member and operably coupled to said motor means in torque transmitting relationship therewith, said traction wheel being disposed in surface contact along with said plurality of wheels; stationary tubular means; clamp means adjustably disposed on said stationary tubular means for mounting said motor drive and control assembly to said wheel chair frame; movable tubular means carried in said stationary means and attached at the lower end thereof to said housing; coil spring means surrounding said movable tubular means and engageably contacting said housing at the upper surface thereof and said stationary tubular means at the lower end thereof; means including a collar carried on said movable tubular means and adapted to be secured to said movable tubular means with said coil spring means compressed in pre-loaded relationship; a control lever operatively disposed at the upper end of said movable tubular means; variable resistance means disposed in said housing; source means including a battery serially connected to said motor means through said variable resistance means; and cable means operatively coupled at one end thereof to said variable resistance means and at the other end thereof to said control lever for controlling the electrical power supplied to said motor means to control the speed thereof.

9. The motor drive and control assembly in accordance with claim 8 further characterized in that said coil spring means includes a first flat annular ring mounted on said stationary tubular means in electrical isolation therefrom, a second flat annular ring mounted on said housing in electrical isolation therefrom, and a coil spring movably disposed between said first and second flat annular rings in electrical contact relationship therewith, said first and second flat annular rings being electrically connected to one terminal of said battery and to one terminal of said motor means respectively.

10. The motor drive and control assembly in accordance with claim 9 further characterized in that said variable resistance means includes a plurality of discs formed from materials having predetermined resistive properties including carbon; and in that said housing includes a bore for receiving said discs in stacked cylinder-like arrangement, an insulative liner disposed in said bore and surrounding all of said discs other than the uppermost disc, a lever pivotly mounted at one end thereof to said housing and extending over the lower end of said bore and forming a support for said plurality of resistive discs, threaded fasteners disposed at the other end of said lever for receiving said cable means in force transmitting relationship to urge said resistive discs upward against the uppermost disc and in turn urge all of said discs against said housing to form a conductive path of less resistance by manipulating said control lever.

11. The motor drive and control assembly in accordance with claim 10 further characterized in that said variable resistance means includes movable contact means attached to said pivotable lever and adapted to engage said housing in electrical contact relationship upon manipulating said control lever to a predetermined position representative of maximum power operation.

12. The motor drive and control assembly in accordance with claim 11 further characterized in that said housing includes two opposing side walls, a top wall having openings including said bore and another opening to receive said movable tubular means in fixed relationship therein, one of said side walls depending downwardly from said top wall along one side thereof and the other of said side walls being threadedly fastened to said top wall; in that said horizontally disposed cylindrical member comprises a sleeve extending orthogonally between said side walls to carry said motor means in axial alignment therein; in that said rotatably mounted traction wheel includes bearing means operatively disposed on said sleeve and having an outer race means and a plurality of roller bearings adapted to rotate over surfaces formed by said cylindrical member; and in that said motor means includes a driven ring member disposed on said bearing means in force transmitting relationship, a power transmitting shaft disposed orthogonally to said traction wheel and to said driven ring member and including a driving member disposed in operative alignment with said driven ring member, and first and second transmission means for coupling said motor means to said power transmitting shaft and for coupling said driving member to said driven ring member respectively for transferring power and torque from said motor means to said traction wheel.

13. The motor drive and control assembly in accordance with claim 12 further characterized in that said first power transmission means comprises a first pulley operatively mounted on the shaft of said motor means, a second pulley operatively mounted on said power transmitting shaft in alignment with said first pulley, and belt means operatively disposed in power transmission relationship on said first and second pulleys; and in that said second transmission means comprises said driven ring member, said driving member, and chain means coacting between said members for transferring power from said power transmitting shaft to said traction wheel.

References Cited

UNITED STATES PATENTS

| 2,417,613 | 3/1947 | Radabaugh. | |
| 2,911,053 | 11/1959 | Ayers et al. | 338—108 X |
| 3,023,825 | 3/1962 | Rabjohn | 180—65 X |
| 3,099,326 | 7/1963 | Weigel et al. | 180—65 X |
| 3,161,249 | 12/1964 | Bouladon et al. | 180—65 X |
| 3,213,957 | 10/1965 | Wrigley | 180—65 X |

FOREIGN PATENTS

| 929,339 | 6/1963 | Great Britain. |

KENNETH H. BETTS, *Primary Examiner.*